No. 884,814. PATENTED APR. 14, 1908.
E. R. GORDON & D. L. WOLFE.
COMBINED WEEDER AND CULTIVATOR.
APPLICATION FILED MAY 18, 1907.
2 SHEETS—SHEET 1.
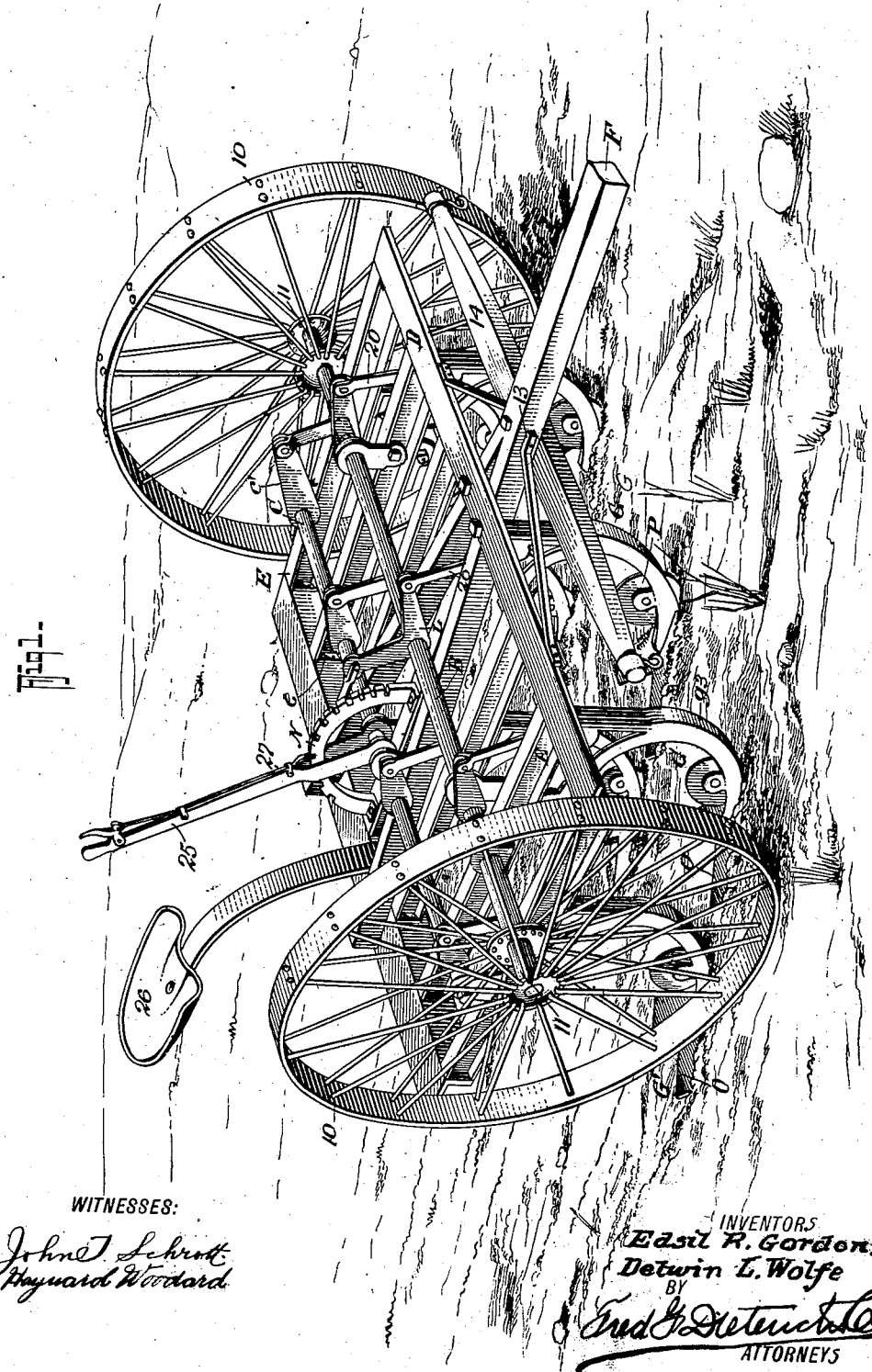
WITNESSES:
John T. Schrott
Hayward Woodard
INVENTORS
Easil R. Gordon,
Detwin L. Wolfe
BY
Fred G. Dieterich & Co.
ATTORNEYS

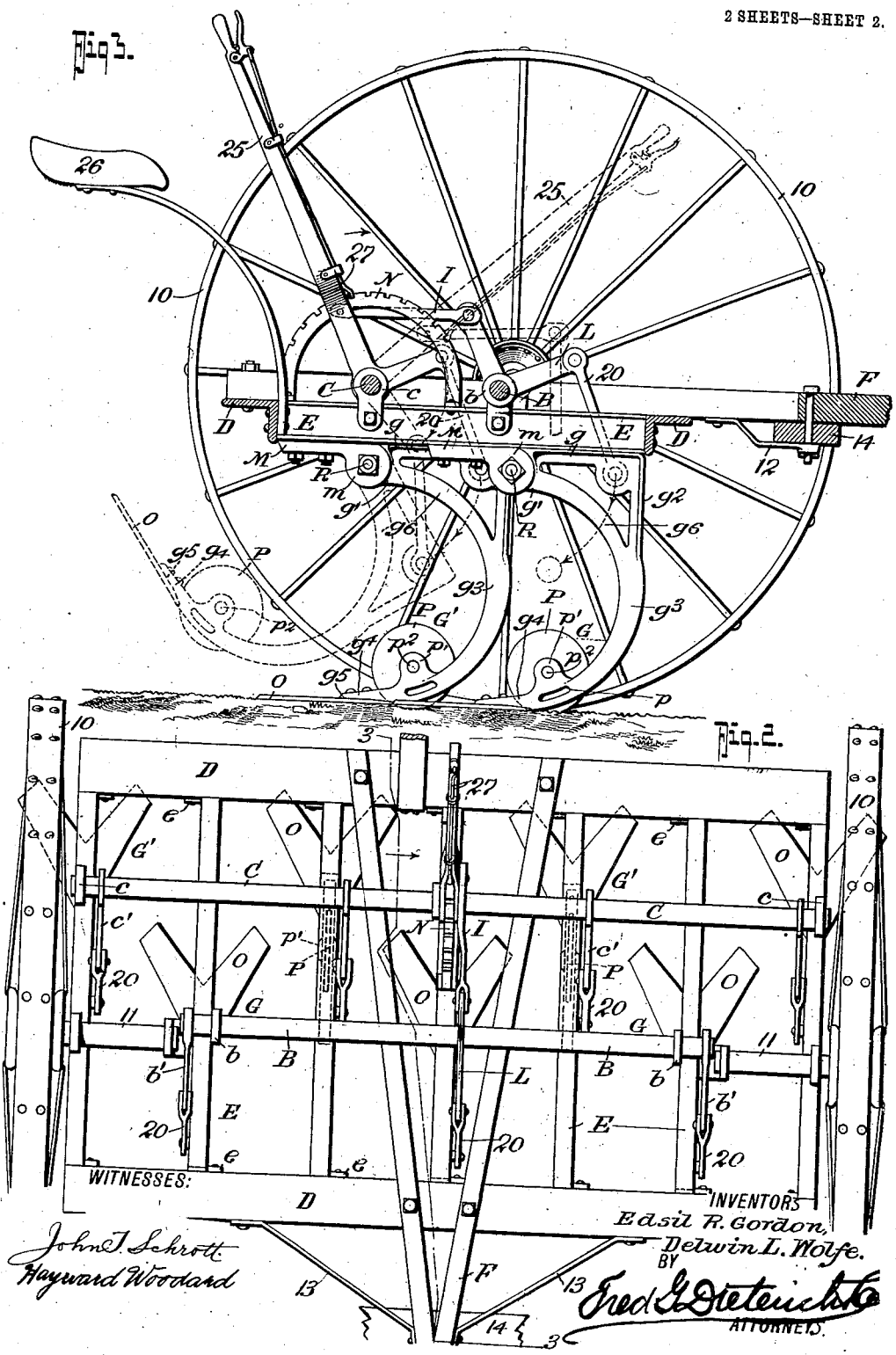

UNITED STATES PATENT OFFICE.

EDSIL R. GORDON AND DELWIN L. WOLFE, OF HARRINGTON, WASHINGTON.

COMBINED WEEDER AND CULTIVATOR.

No. 884,814.

Specification of Letters Patent.

Patented April 14, 1908.

Application filed May 18, 1907. Serial No. 374,396.

*To all whom it may concern:*

Be it known that we, EDSIL R. GORDON and DELWIN L. WOLFE, residing at Harrington, in the county of Lincoln and State of Washington, have invented a new and Improved Combined Weeder and Cultivator, of which the following is a specification.

Our invention seeks to provide a simple, inexpensive and easily manipulated means for effectively cutting weeds under surface of the ground and distributing same over the soil thereby cultivating the soil and destroying weeds by one operation.

In its general nature our invention comprehends an improved coöperative arrangement of parts and especially a new construction of cutter carrying standards pivotally suspended from the supporting frame with which the draft tongue connects, the connection of the said standards with the frame being especially designed, so that when the frames are adjusted to their operative or weed cutting position, they will be firmly braced to effect a uniform pull of the blades in the horizontal plane, whereby to cut the weeds under surface of ground.

Our invention also embodies an improved means actuated from a single lever for swinging up a plurality of independent sets of cutters whereby to clean them from accumulation of cut stalks or other vegetable matter, which is in the soil and also for sustaining the cutters out of an operative position for cleaning them and when conveying the machine from one field to another.

In its more subordinate features our invention consists in details of construction hereinafter fully described, specifically pointed out in the claims and illustrated in the accompanying drawings, in which:—

Figure 1, is a perspective view of our invention. Fig. 2, is a plan view thereof. Fig. 3, is a vertical longitudinal section of the same, taken substantially on the line 3—3 on Fig. 2, the blades and their pivoted supporting frames being shown at their elevated position in dotted lines.

In the practical arrangement of our invention, the main frame is in the nature of a transverse rectangular body formed of two parallel front and back angle beams D—D and a series of cross members E—E whose opposite ends have flanges $e$—$e$ whereby they may be readily bolted to the front and back beams D—D as clearly shown in Fig. 2.

10—10 designates the supporting wheels, each of which is mounted on separate short axles 11—11, the said axles being journaled in suitable bearings on the cross members E—E at the opposite ends of the frame, and F designates a draft tongue that is mounted upon the rectangular frame, is braced thereon by the side stays 13—13 and supports a stirrup 12 on its under sides to receive the swingletree 14.

The construction of the parts so far described are of the conventional arrangement, and they therefore form, *per se*, no part of our invention, the details of which will be now set forth.

Referring more particularly to Figs. 1 and 3, it will be noticed that a series of pendent frames are pivotally secured to the under side of the cross beams, one for each beam, and the said pivoted frames are staggeredly arranged, one set of alternate frames being disposed in advance of the other set, the forward set of frames being indicated by G and the rear set by G'.

Each of the pendent frames consists of an elongated horizontal head $g$ having substantially the width of the cross beam to which it is connected and extended in the longitudinal plane of the said cross beam, whereby when it is adjusted to its vertical or weed cutting position, the said head $g$ will bear flatwise its entire length against the under side of the cross beam and thereby form a rigid bearing to provide for the proper adjustment of the cutters with respect to the ground, as will presently more fully appear.

The rear end of the head $g$ terminates in an apertured extension $g'$ for fitting the bifurcated end $m$ of a bracket M that is bolted to the under side of a cross beam E, the said bracket end being apertured to receive the stud or pintle R for pivotally mounting the frame G.

The front end of the frame G comprises a pendent vertical portion $g^2$ that extends down about half the distance between the beam E and the ground and merges with a circular portion $g^3$ that curves rearwardly for the reasons presently explained, and it terminates in a rearwardly projected horizontal or foot portion $g^4$ that is provided at the rear end and upon the under side with a transverse seat $g^5$ shaped to receive the apex end of the cutter O, which cutter is of the diverging or flaring arm type as best shown in Fig. 2 and to add rigidity to the said frames G, they are cast or otherwise formed with diagonal curved members $g^6$ as shown.

At a point forward of the cutter receiving end, the lower ends of the frames G and G' have elongated slots $p$ and side bearings $p'—p'$, the latter being provided to receive a short pintle $p^2$ of the colters P which are so mounted with respect to the cutters that their lower edges are disposed in a plane below that of the cutters as clearly shown in Fig. 3, whereby, as the cutters pass over the ground, the colters penetrate the ground and in addition to the weed separating and cutting functions they also act as guides for steadying the frames G from undue lateral spring.

To provide for holding the several frames G—G' with their upper or head portions rigidly against the cross beams E—E during the weed cutting portion and also for conveniently and simultaneously elevating all of the frames G and G' to a position for clearing or for holding them off the ground when moving the machine from one field to another, we employ a compound lever mechanism, which comprises two rock shafts B and C mounted parallel with the wheel axles and mounted in suitable bearings $b$ and $c$ bolted to the cross beams E—E, as shown.

On each of the shafts B and C is pivotally mounted a series of crank arms $b'—c'$, one for each frame G—G' that are linked to the said frames by the bars 20—20 that pivotally connect to the frames at the front or angle end of the head portions thereof, as clearly shown in Fig. 2, by reference to which it will also be noticed that the rear rock shaft C has connected to it a lever 25 that is disposed convenient to the driver's seat 26 and is provided with a short hand controlled latch pawl 27 for engaging a segmental rack N.

At a suitable point, the rock shaft B has a crank L that projects therefrom at right angles to the cranks $b'—b'$ and to which pivotally connects one end of a link I, the other end of which pivotally joins with the lever 25.

From the foregoing, taken in connection with the drawings, it is believed the complete construction and the manner in which the several parts operate, will be readily understood.

By reason of forming the frames G—G' with the straight head portions and connecting the several frames to a single lever actuated means as shown, it is manifest that the entire set of cutter carrying frames can be readily swung backwardly and upwardly to the position shown in dotted lines in Fig. 2, and held there ready for cleaning the cutters and the colters or for holding them to clean the trash when moving the machine off the field.

Another and important advantage for combining the several parts as stated, is that the flat heads of the frames G—G' provide for positively preventing the swinging of the said frames too far forward and in consequence bringing the cutter out of a proper horizontal cutting position as well as rigidly sustaining the said frames with the cutter in the desired horizontal position during the operation of cutting the weeds, and furthermore, by curving the front edges of the cutter carrying frames, the said frames will the more readily pass over the rubbish and weeds than would be possible if the straight portions extended the full distance thereof.

Having thus described our invention, what we claim and desire to secure by Letters Patent, is:—

1. In a machine of the character described; the combination with a transportable or main frame; of a supplemental rearwardly curved frame pivotally supported from the main frame, a cutter mounted on the lower end of the supplemental frame and disposed in a horizontal plane relatively to the said frame, and means for swinging the frame backward and locking it to such position and for fixedly holding the said frame when it is swung down to its vertical or operative position, as set forth.

2. In a machine of the character described, the combination with the transportable frame, said frame including a longitudinal cross beam; of a cutter carrying frame comprising a horizontal head member, pivotally connected at one end to the cross beam, its other end merging with a pendent portion, the latter having a rearwardly projected heel like extension, a cutter secured to said extension and disposed in a plane parallel with the horizontal head portion of the frame, means adapted under one adjustment for holding the head portion in a fixed abutment with the cross beam, and under another adjustment for swinging the said cutter carrying frame rearwardly and for locking it to its elevated position, as set forth.

3. In a machine of the character stated, in combination with a transportable frame; of a cutter carrying frame pivotally suspended on the transportable frame and comprising a horizontal head portion that terminates with a vertical pendent portion, the latter merging with a rearwardly curved portion, the end of the curved portion terminating in a heel adapted to pass over the ground, a horizontally disposed cutter secured to said heel, a rack on the transportable frame, a bell crank lever having a pawl for engaging said rack, and a link connection connecting said bell crank lever with the front or angle end of the head portion of the cutter carrying frame, as set forth.

4. In combination with a transportable frame which includes longitudinal cross bars E; of a cutter carrying frame comprising a head portion having a horizontally disposed member, the front end of which merges with a vertical pendent portion, the latter merging with a rearwardly curved extension the lower end of which terminates in a heel, the cutter mounted on the said heel and disposed in the horizontal plane relatively thereto, the head portion of the frame being pivotally mounted at the rear end in bearings on the under side of the cross beam, a crank lever and rack mechanism and link connections joining the said crank lever and rack mechanism with the front or angle end of the cutter carrying frame, all being arranged substantially as shown, whereby the cutter carrying frame when swung to its operative position can be rigidly held to bear with its head portion against the cross members of the transportable frame and when swung back out of the operative position it can be held locked to said position, as set forth.

EDSIL R. GORDON.
DELWIN L. WOLFE.

Witnesses:
W. A. CLINE,
J. R. LEDFORD.